Patented Aug. 30, 1927.

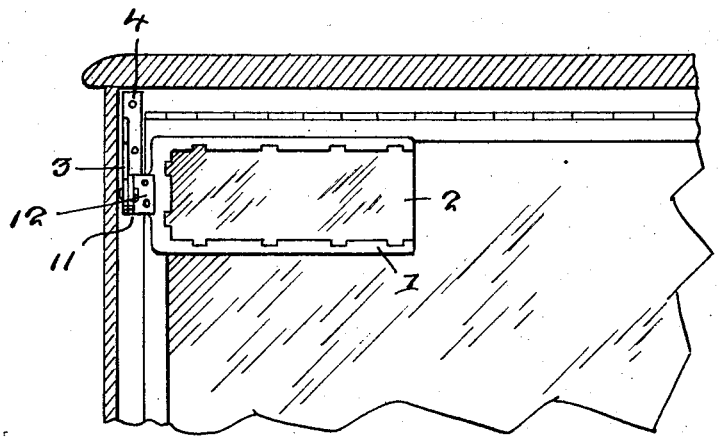
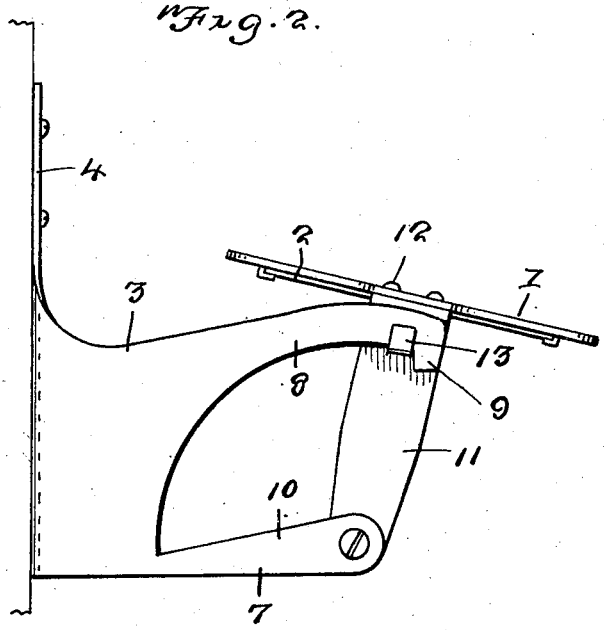
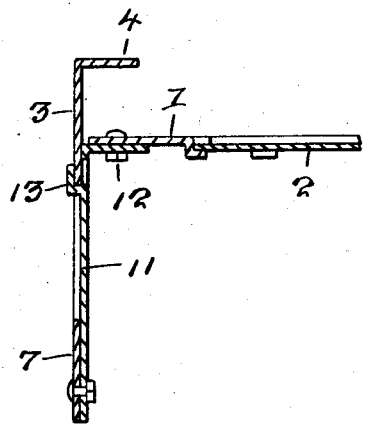

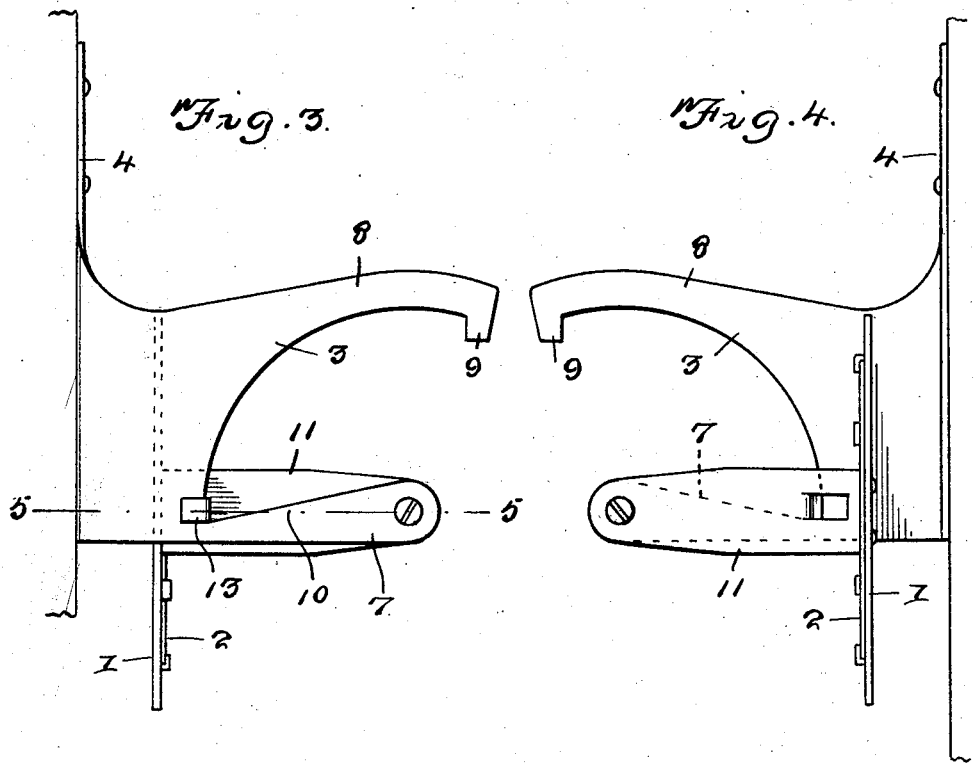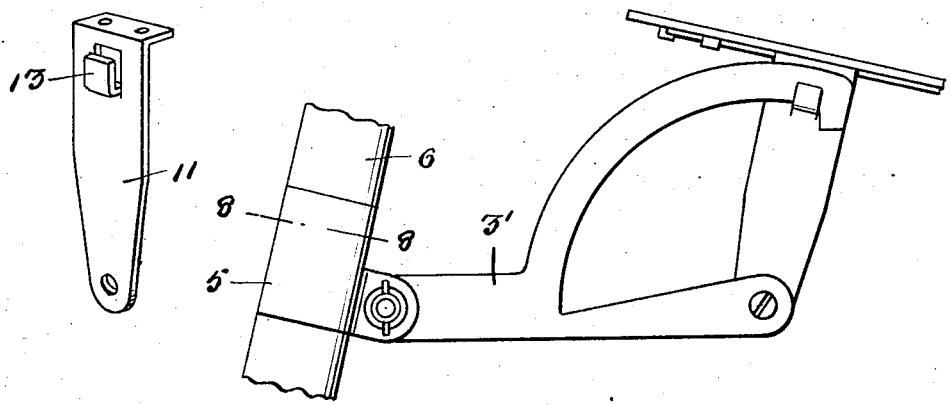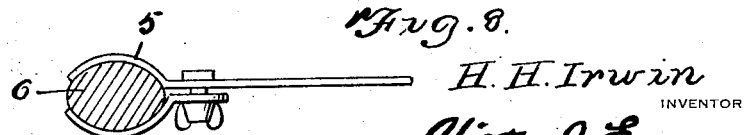

1,640,897

UNITED STATES PATENT OFFICE.

HENRY H. IRWIN, OF GREENVILLE, SOUTH CAROLINA.

GLARE SHIELD.

Application filed August 26, 1926. Serial No. 131,760.

This invention relates to a glare shield for motor vehicles and the like, the general object of the invention being to provide means for holding the shield either in a position in line with the vision of the driver of the vehicle or in a horizontal position above the line of vision, such means being so arranged that the device remains in either one of its two positions under the action of gravity so that springs and locking devices are not necessary.

Another object of the invention is to so form the parts that they can be manufactured to sell at low cost and a device can be placed on a vehicle very easily and with the use of but simple tools.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a sectional view through portion of a top of a closed type of vehicle, showing the invention in operative position therein.

Figure 2 is an elevation of the invention, with the shield in raised position.

Figure 3 is a similar view, with the shield in lowered and operative position.

Figure 4 is a view similar to Figure 3, but looking toward the other side of the device.

Figure 5 is a section on line 5—5 of Figure 3.

Figure 6 is a perspective view of the shield supporting arm.

Figure 7 is a view of the device modified to be used with the open type of vehicle.

Figure 8 is a section on line 8—8 of Figure 7.

As shown in these drawings, the device includes a frame 1 which supports a transparent member 2 which is colored or otherwise treated to prevent the glare of headlights of other vehicles and the like from blinding the driver of the car or vehicle on which the device is placed, and a bracket 3 to which the frame is movably connected and which is fastened to a part of the vehicle.

When the device is used in a closed type of vehicle, the bracket is provided with a part 4 which is screwed or otherwise fastened to an interior wall of the vehicle, as shown in Figures 1, 2, 3 and 4, and when the device is used in an open type of vehicle, the bracket is pivoted to a clamp 5 which is adapted to clamp a part of the windshield frame 6 or other part of the vehicle, as shown in Figures 7 and 8.

The bracket is formed with a lower arm 7 and with an upper arm 8, the arm 8 being of arc shape and extending beyond the arm 7 so that its extremity is to one side of the vertical plane of the extremity of the arm 7. The arm 8 has a depending part 9 at its extremity which acts as a stop, as will be hereinafter described. The arm 7 has its upper edge sloping downwardly from its free edge to the body of the bracket, as shown at 10. An arm 11 is pivoted at its lower end to the outer end of the arm 7 and the bent over upper end of this arm 11 is fastened to the frame 1, as shown at 12. A tongue 13 is struck from the arm 11 and this tongue is offset from the arm so as to form a guide for engaging the arm 8 in the movement of the arm 11 to prevent lateral play of the said arm 11 in its movement. This tongue will also engage the stop 9 and thus limit the outward movement of the arm 11. It will also engage the reduced inner part of the arm 7 at the other limit of movement of the arm 11 and hold the arm 11 in horizontal position with the frame 1 in vertical position.

From the foregoing, it will be seen that as the arm 11 is moved from one position to another, the frame 1 will be moved from a vertical position, as shown in Figures 1, 3 and 4, where its transparent member is in the line of vision of the driver, to a substantially horizontal position above the line of vision, as shown in Figures 2 and 7. In this latter position, the arm 11 is to one side of a vertical plane and thus the arm and the frame are held in this position by gravity. When the frame is to be lowered to operative position, it is simply necessary to push upon the frame or arm to cause the parts to drop to their other position, when the stop 13 engaging the inner end of the arm 10 will bring the parts to rest with the frame in vertical position so that the driver must look through the transparent member of the frame to see the road ahead. Thus the device is held in either one of its two positions by gravity and springs and locking means are not necessary. The parts can be stamped from sheet metal so that the device can be manufactured to sell at low cost and either form of device can be quickly and easily put in place on a vehicle by a person unskilled in the use of tools.

The body of the bracket, shown in Figures 7 and 8 at 3', is much smaller in dimensions than that shown in the other figures.

I prefer to make the transparent member of such a color that it will not interfere with the vision of the driver while in use either at night or during the day and I also so position the parts that the frame overlaps the corner of the windshield frame, as shown in Figure 1 so as to prevent any light from entering between the frame 1 and the corner of the windshield frame.

When the device is to be moved to an inoperative position, it is simply necessary to push upon the frame or the arm 11 to move the parts upwardly until the stop on the arm engages the stop on the arm 8, as shown in Figures 2 and 7.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

An anti-glare device for a vehicle comprising a frame, a transparent member carried thereby, a bracket adapted to be attached to a part of a vehicle, said bracket having a lower straight arm and an upper arc-shaped arm, the upper arm having its extremity extending outwardly beyond the extremity of the lower arm, a stop on the upper arm at the end thereof, a lever or arm pivoted at its lower end to the end of the lower arm and having a guide formed thereon for engaging the lower curved edge of the upper arm, said guide engaging the stop for limiting the outward movement of the lever and means for attaching the upper end of the lever or arm to the frame.

In testimony whereof I affix my signature.

HENRY H. IRWIN.